T. H. WHELESS.
RAILWAY.
APPLICATION FILED DEC. 30, 1908.
968,616.
Patented Aug. 30, 1910.
4 SHEETS—SHEET 1.
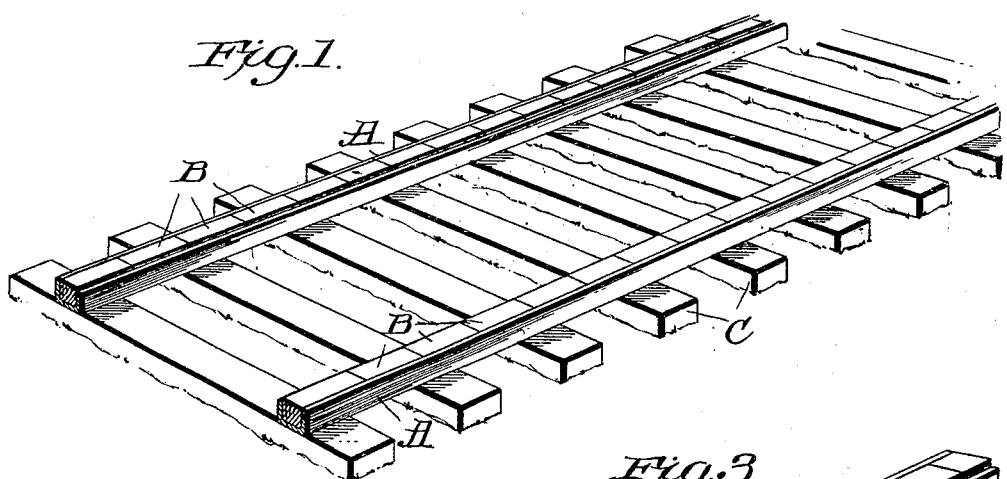
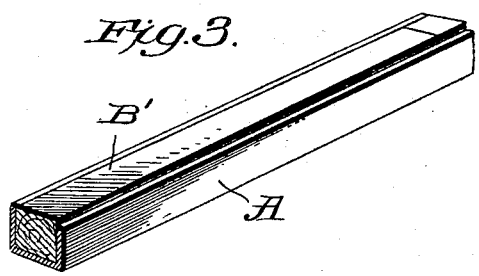
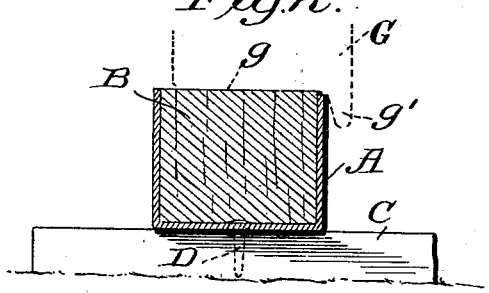
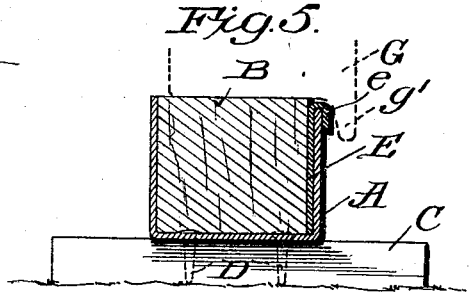
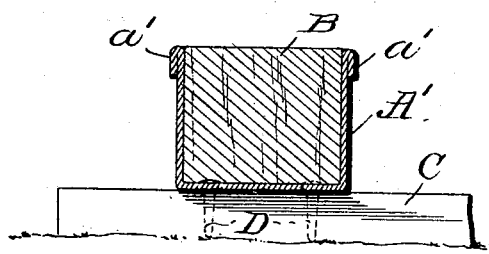
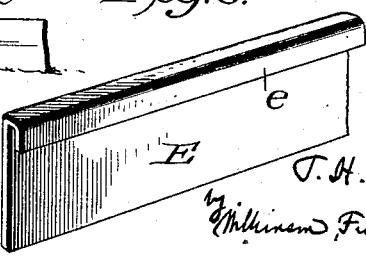
Witnesses
Geo. H. Bepue.
A. W. Neale, Jr.
Inventor
T. H. Wheless,
by Wilkinson, Fisher & Witherspoon
Attorneys.

T. H. WHELESS.
RAILWAY.
APPLICATION FILED DEC. 30, 1908.
968,616.
Patented Aug. 30, 1910.
4 SHEETS—SHEET 2.
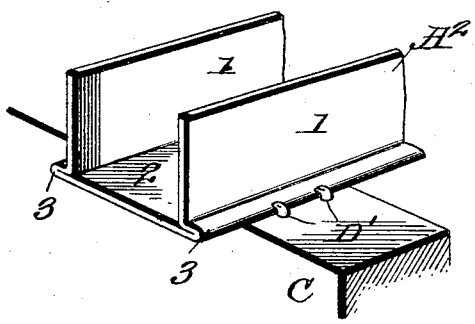
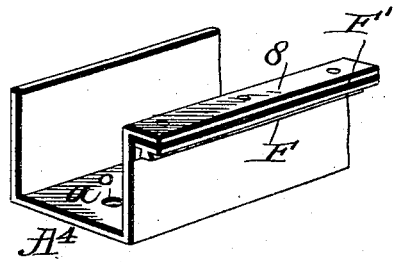
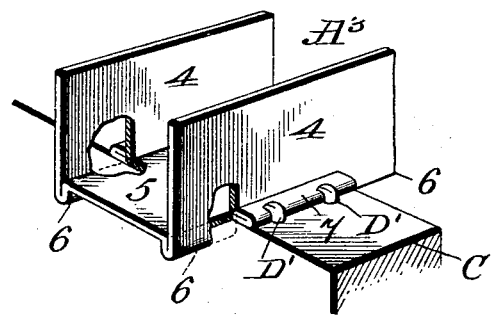
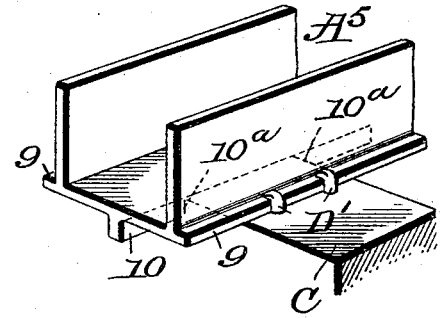
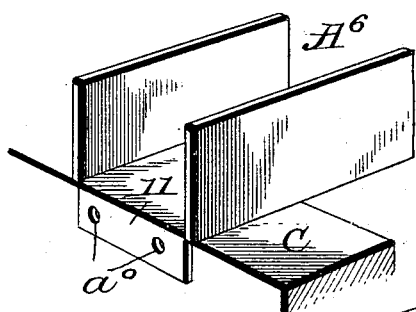
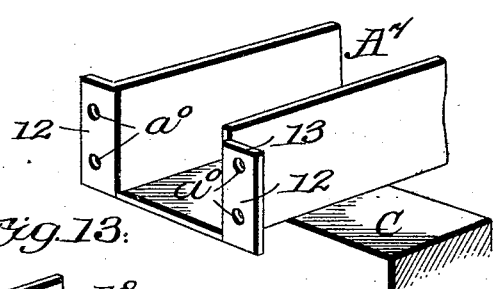
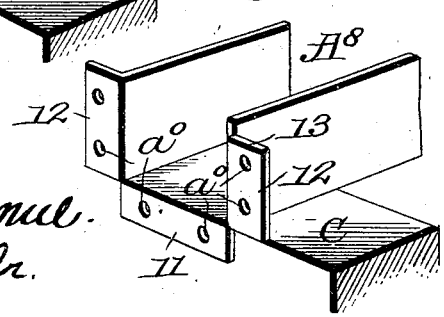

T. H. WHELESS.
RAILWAY.
APPLICATION FILED DEC. 30, 1908.

968,616.

Patented Aug. 30, 1910.
4 SHEETS—SHEET 3.

Witnesses
Geo. H. Bepue.
A. W. Neale Jr.

Inventor
T. H. Wheless,
by Wilkinson, Fisher & Witherspoon
Attorneys.

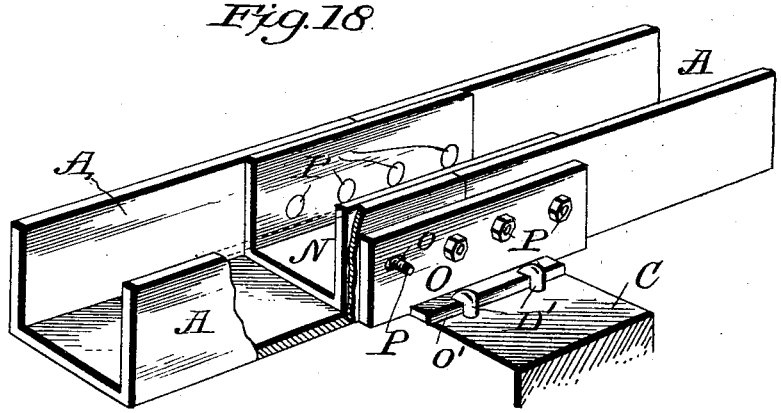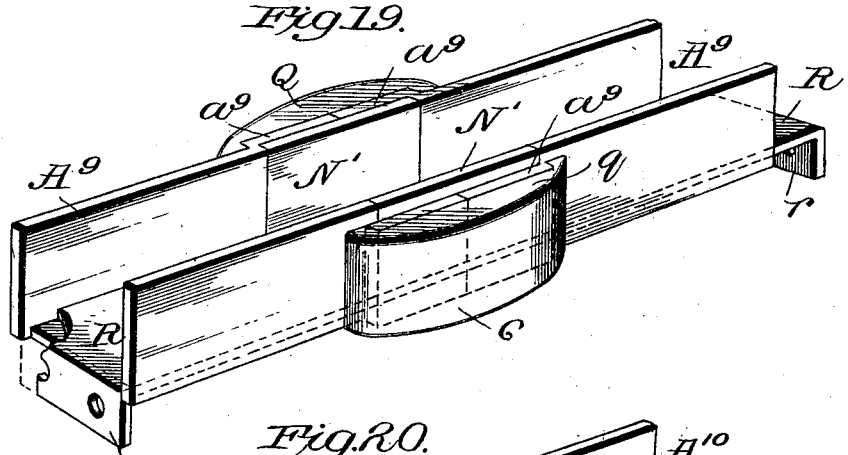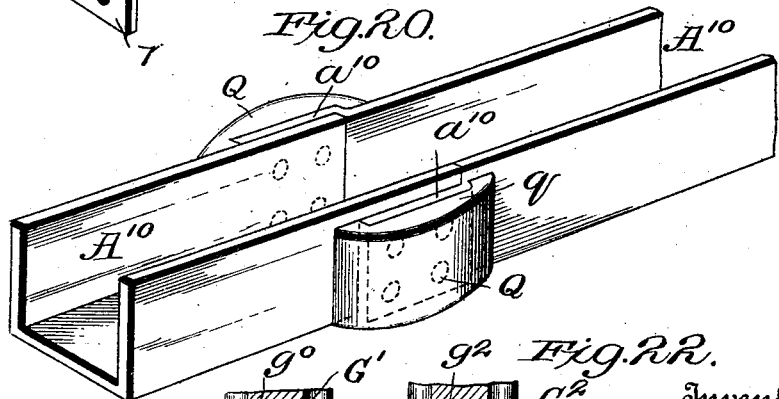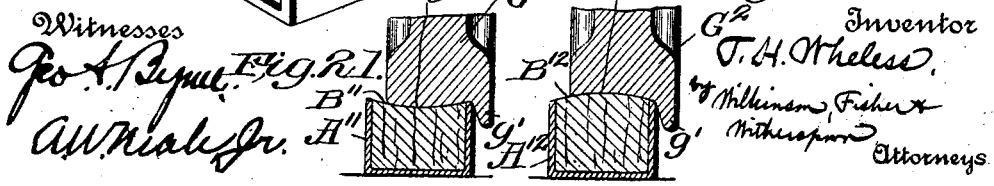

UNITED STATES PATENT OFFICE.

THOMAS HENRY WHELESS, OF NEW YORK, N. Y.

RAILWAY.

968,616.  Specification of Letters Patent.  Patented Aug. 30, 1910.

Application filed December 30, 1908. Serial No. 469,971.

*To all whom it may concern:*

Be it known that I, THOMAS HENRY WHELESS, a citizen of the United States, residing at New York, in the county of New York and State of New York, have invented certain new and useful Improvements in Railways; and I do hereby declare the following to be a full, clear, and exact description of the invention, such as will enable others skilled in the art to which it appertains to make and use the same.

My invention relates to improvements in railways, and it consists in providing a combination rail composed of wood and metal, but mainly of wood, in which the wheels of the locomotive or other rolling stock travel along the upper face of the wood, and in which part of the metal casing for the wood serves to guide the wheels of the rolling stock against lateral deviations. A thin metallic trough-like receptacle is provided, in which blocks of wood are placed, preferably with the grain running vertically, and these blocks of wood resting in the base of the trough-like receptacle, which is secured to the top of the ties, have their bases just above the ties, and having a broad bottom and being held in the metallic receptacle, are very firmly secured against all strains incident to service.

My invention will be more clearly understood by reference to the accompanying drawings, in which the same parts are indicated by the same letters and numerals throughout the several views.

Figure 14:
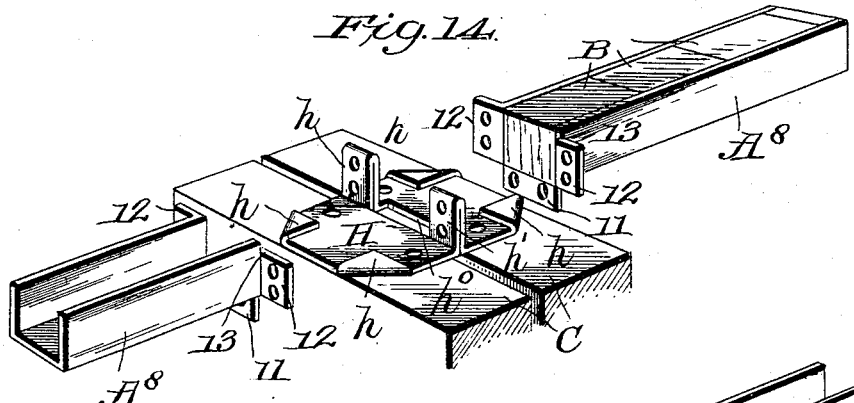
Figure 15:
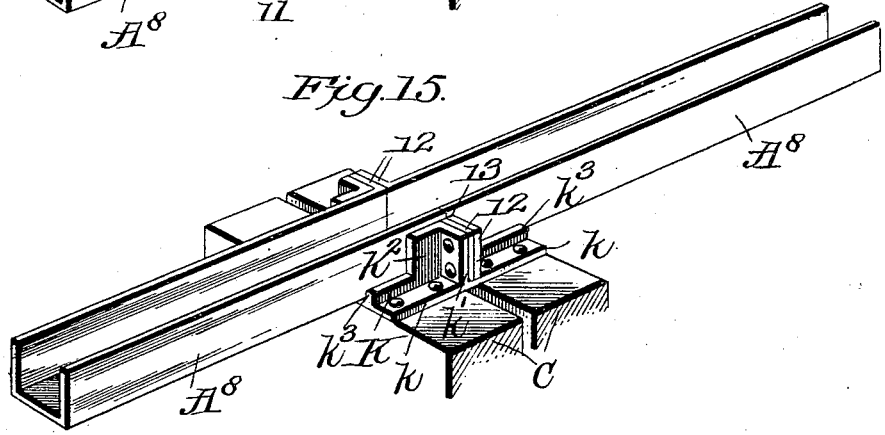
Figures 16, 17:
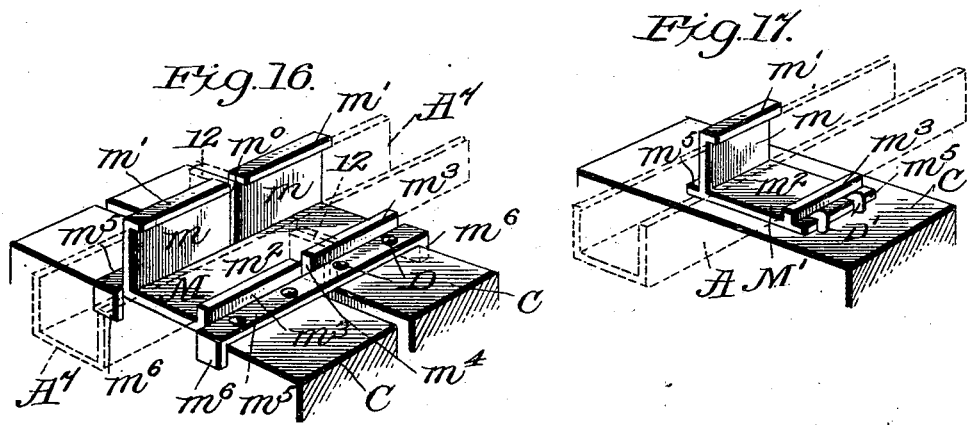

Figure 1 is a perspective view, showing my invention in the simplest form. Fig. 2 shows a section of one of the rails of Fig. 1 on an enlarged scale, with a portion of the car wheel traveling on the rail shown in dotted lines. Fig. 3 is a perspective view of a rail similar to that shown in Figs. 1 and 2, except that the grain of the wood runs longitudinally instead of vertically. Fig. 4 shows a cross section, in modified form, of rail, in which the sides of the trough are bent over to form guard flanges. Fig. 5 shows a cross section of a rail similar to that shown in Fig. 2, but with an auxiliary removable flange guard added, a car wheel being shown in dotted lines. Fig. 6 is a perspective view of the auxiliary removable flange guard shown in Fig. 5. Fig. 7 shows a modified form of trough formed of a single plate with flanges at its base. Fig. 8 shows still another modification, parts being broken away. Fig. 9 shows the device as it may be applied to an electric railroad. Fig. 10 shows the metallic trough in the form of a casting. In the other forms of this device, this trough is represented as of rolled sheet or plate metal. Figs. 11, 12 and 13 show the metal trough provided with flanges for securing the contiguous members to each other. Fig. 14 shows a chair mounted on the cross ties, and two contiguous sections of the rail ready for assembling. Fig. 15 shows a modified form of joint chair with the rails secured thereto. Fig. 16 is a perspective view showing still another form of joint chair, with the ends of the metallic trough indicated in dotted lines. Fig. 17 shows a chair for supporting any part of the rail, the metallic trough being shown in dotted lines. Fig. 18 is a perspective view showing the joint chair and means for connecting the abutting ends of the troughs. Figs. 19 and 20 show other ways of connecting the ends of the metallic troughs together. Fig. 21 shows a concave rail with a convex car wheel running thereon. Fig. 22 shows a convex rail with a concave car wheel running thereon.

Referring to Figs. 1 and 2, A represents a metallic trough, preferably made of sheet or plate metal rolled into rectangular section, with the inner side slightly lower than the outer, in which trough blocks of wood B are mounted having the grain vertical. These blocks of wood project slightly higher than the upper inner edge of the metallic trough, as shown in Fig. 2. On these blocks of wood, the tread g of the car wheels G runs, and the flange g' of said wheels projects down on the inside of the rail, and engages the upper edge of the trough on the inside of the track, as shown in Fig. 2. Thus the wheel is supported on the ends of the fibers of the wood, while the flange bears against the metallic side of the trough, and any tendency of the wheel to rub away the wood, due to lateral vibrations, is avoided. The thrust of the wheel being on the end of the grain of the wood, the latter will stand very heavy weights and wear. The blocks of wood should preferably be treated with preservative material, preferably creosote oil, which would protect the wood from decay, and also, in a large measure, keep moisture out of the same. By having the wooden blocks driven firmly into the metallic trough, and pressed closely against each other, the tendency of the fibers to split off is largely obviated, and a wheel running surface is provided, which yields great tractive effect, and is practically noiseless.

In the form of device shown in Fig. 3, dimension timber B′, with the grain running lengthwise, is substituted for the short blocks with the grain running vertically, but this form of rail could only be used for light traffic.

In the form of device shown in Fig. 4, the rolled trough A′ has its sides flanged over, as at $a'$, thus adding stiffness to the upper portion of the trough, and providing an auxiliary guard for the wheel flange.

In the form of device shown in Fig. 5, a removable plate E is put in the inside of the trough and resting upon the bottom thereof, and has its upper end flanged over, as at $e$, to form a stiffened wearing surface for the flange of the wheel. This removable plate E is shown in perspective in Fig. 6.

In the form of device shown in Figs. 1 to 5, the metal trough may be secured to the cross ties in any convenient manner, as by means of spikes D, preferably countersunk in the bottom of the trough.

In the form of device shown in Fig. 7, the rolled metal trough $A^2$ has its vertical sides 1 joined to the flat base 2 by a bead 3, and this may be secured to the cross ties, either by hooked spikes D′, or by straight spikes, such as D, shown in Figs. 2, 4 and 5.

In the form of device shown in Fig. 8, the rolled metal trough $A^3$ has its vertical sides 4 connected to its base 5 by a downwardly-projecting bent portion 6 and by the lateral flanges 7, which latter may be secured to the cross ties C by means of the hooked spikes D′. These downwardly-projecting lugs 6 engage the sides of the cross ties, and hold the trough against longitudinal thrust.

In the form of device shown in Fig. 9, the metal trough $A^4$ is provided with a lateral flange 8, beneath which is secured the conducting rail F, insulated from the flange and from the trough by insulating material F′. This trough forms a convenient arrangement for electric railways. In this form of trough, suitable spike holes $a°$ are provided.

Fig. 10 shows a cast metal trough $A^5$, having lateral flanges 9, and a vertical web 10, which latter may be cut away, as at $10^a$ to engage the sides of the cross ties, and thus hold the trough against longitudinal thrust.

In the form of device shown in Fig. 11, the metal trough $A^6$ has a downwardly-projecting flange 11, engaging the side of the cross tie C, which flange is provided with rivet holes $a°$ to connect to the next section of trough, whereby a continuous line may be secured.

In the form of device shown in Fig. 12, the rolled metal trough $A^7$ is provided with end flanges 12, one of which is cut away, as at 13, to permit the passage of the flange of the car wheel.

In the form of device shown in Fig. 13, the lateral end flanges 12 are provided, one of which is cut away, as at 13, for the purpose already described, and also a downwardly-projecting flange 11 is provided, all of which flanges are provided with rivet holes $a°$ to connect the same to the next section of trough.

Referring now to the structure shown in Fig. 14, two troughs $A^8$ are shown, ready for assembling with the chair H, which is mounted on the ties C. This chair is preferably made out of plate metal, slotted as at $h°$, bent up to form two perforated lugs $h'$, and having the corners $h$ turned over to form guide lugs for the sides of the trough $A^8$. In assembling these parts, the downwardly-projecting flanges 11 are inserted in the slot $h°$, and the side flanges 12 are connected together by rivets passing through the lugs $h'$. The sides of the trough are held between the turned-over corners $h$. In this figure, the blocks B are shown in one of the troughs, while the other trough is shown without these blocks.

In the form of device shown in Fig. 15, the troughs are generally similar to those shown in Fig. 14, but the chair is made in the form of a casting K, having bottom flanges $k$, and vertical ribs $k'$, $k^2$, $k^3$. On the inner side of the track, the chair is lower than on the outer side and the side flanges 12 are cut away, so as to permit the passage of the flange of the car wheel. In Fig. 15, the wooden blocks are omitted from the trough.

In the form of device shown in Fig. 16, the two sections of trough $A^7$ are shown in dotted lines, while the chair M is provided with vertical side walls $m$ and $m^3$, which are slotted as at $m°$, $m^4$ to receive the side flanges 12 of the troughs. The top of the side walls is preferably bent over as at $m'$ to hold the ends of the troughs down. The side flanges $m^5$ of the chair are secured to the cross ties C, and preferably have their ends bent over, as at $m^6$, to engage the sides of the cross ties.

In the form of device shown in Fig. 17, the chair M′ is shown as a support for the trough A, which chair has a side wall $m$ turned over, as at $m'$, to engage the top of the trough with the bottom plate $m^2$ and rib $m^3$ to engage the opposite side of the trough and with the side flanges $m^5$, which may be either perforated to receive spikes, or hooked spikes D' may be used to secure said chair to the cross ties.

Fig. 18 represents one means of securing the abutting ends of the troughs together, in which the lining trough N is placed over the abutting ends of the two troughs, and abreast of this lining trough is an angle bar O having a flange O' secured to the cross tie C, as by means of the spikes D'. This angle bar is perforated with elongated holes $o$, to receive the bolts P, so that slight longitudinal play is permitted to said bolts, thus compensating for the expansion and contraction of the rail. In this form of device, the blocks in the lining trough N must be of less width than those in the main trough, and this objection is avoided in the device shown in Fig. 19, in which the abutting ends $a^9$ of the troughs $A^9$ are bent outward to receive the lining plate N', which is flush with the interior of the trough, and these bent out ends $a^9$ are held with suitable blocks Q welded, or otherwise secured over the bent out ends $a^9$ of the main troughs, thus producing a continuous rail. In case it is desired to stiffen the bottom of the trough, especially at the joints, a lining plate R may be provided, as shown in Fig. 19, having downwardly-projecting flanges $r$, which may be secured to corresponding plates in the adjoining section of the trough.

In the form of device shown in Fig. 20, one end $a^{10}$ only of each trough is bent out, and the corresponding end of the other trough fits snugly therein, and these parts are welded together to the block Q to form a continuous rail. One of these blocks Q is cut away, as at $q$, to permit the flange of the wheel to pass. It will be obvious that these telescoping ends of the troughs $a^{10}$ may be bolted together, as indicated in dotted lines, thus omitting the welded blocks Q.

In the form of device shown in Fig. 21, the trough $A^{11}$ has blocks $B^{11}$ concave on top, in which concave portion the convex tread $g^0$ of the car wheel G' engages. The flange of this wheel is guarded against lateral motion by the side of the trough on the inside of the track.

In the form of device shown in Fig. 22, the wooden blocks $B^{12}$ in the trough $A^{12}$ are convex to engage the concave tread $g^2$ of the car wheel $G^2$.

It will be noted that in the various forms of the device herein described and shown, the wooden blocks are mounted in a thin and comparatively light metal trough, preferably substantially rectangular in cross section, into which said blocks are forced under pressure, and fitted snugly together endwise, thus forming a continuous wooden bearing for the tread of the car wheels. The deep sides of the trough form vertical girders of great strength and rigidity against downward thrust, while the wide plate, forming the bottom of the trough, on which the bases of the blocks rest, forms a rigid beam against lateral distortion of the track. Again, by having the support for the bases of the wooden blocks broad and low down next to the cross ties, the tendency to turn over the rails laterally by a heavy train going around curves is much less than with the comparative high and narrow base rails now in use. Again, it will be noted that the T-rail, now in general use, has a restricted width, and only a small portion of the wheel tread is available for tractivity. This decreases the traction of the wheels, and increases the wear on the wheels and on the rails. Furthermore, by having the metal of the rail in the form of a rectangular trough, a far lighter rail may be made, and of equal strength, than the form of metal T-rail now generally in use. Furthermore, by having the troughs made of plate or sheet metal, these may be manufactured very much more cheaply than the T-rails now generally in use; and the plates may be shipped in flat form to the locality where they are to be used, and then bent into proper shape by very simple and inexpensive machinery.

The blocks of wood are preferably driven or forced in from the top to form a snug fit, as this method is more direct and economical. The sides of the trough will yield slightly as the wood expands and hold same firmly. Should it be desired to remove the troughs from the cross ties, the sections of wood may be dug out with any suitable pointed tool.

It will be noted that in a rail of this character an exceedingly strong joint may be secured which will not yield as the wheels pass over it, a serious fault with the ordinary T-rails now in use.

It will be noted that by having the wooden surface for the metallic treads of the car wheels to run upon greatly increased tractive effect is secured, and moreover, the wear of metal on wood will be less than metal on metal in stopping the train; and therefore, the wheels would not tend to appreciably wear unevenly, and the serious objection, known as "flat wheel" would be, in a large measure, avoided. Furthermore, in a track of this kind, there would be less tendency of the wheels to slip in stopping the train hurriedly with the brakes, and therefore the train could be stopped quickly and with less air-pressure on the brakes.

In constructing the rails, it might be desirable to paint the inside of the trough with tar, in addition to treating the blocks themselves with preservative material, such as creosote oil, thus filling up all the crevices between the ends of the blocks, and between the blocks and side walls of the trough, and in a large measure excluding moisture.

It will be obvious that any of the rectangular rails herein described may be provided with side shelves 8, as shown in Fig. 9, to which the insulated rail F may be attached for use on electric railways.

Having thus described my invention, what I claim and desire to secure by Letters Patent of the United States, is:—

1. A railway, comprising a series of metal troughs connected together and adapted to be secured to the cross-ties, a removable plate placed on the inner side of the trough and bent over the edge of said trough to form a lateral guide for the flange of the car wheel, and a series of wooden blocks fitting tightly in said troughs and forming a supporting surface for the tread of the car wheels, substantially as described.

2. A railway, comprising a series of metal troughs connected together and adapted to be secured to the cross-ties, a removable plate placed on the inner side of the trough and bent over the edge of said trough to form a lateral guide for the flange of the car wheel, and a series of wooden blocks having the grain running vertically, fitted tightly in said trough and projecting above the top of the same, forming a supporting surface for the car wheel, substantially as described.

3. A railway, comprising a series of substantially rectangular metal troughs connected together and adapted to be secured to the cross-ties, one side of the trough forming a lateral guide face for the flange of the car wheel, and the other side of said trough being provided with a lateral flange, an insulated electrical conductor carried by said flange, and a series of blocks fitting tightly in said troughs and forming a supporting surface for the tread of the car wheels, substantially as described.

4. A railway, comprising a series of substantially rectangular metal troughs connected together and adapted to be secured to the cross-ties, one side of the trough forming a lateral guide face for the flange of the car wheel, and the other side of the trough being provided with a lateral flange, an insulated electrical conductor carried by said flange, and a series of wooden blocks treated with a preservative compound, and having the grain running vertically, fitted tightly in said trough and projecting above the top of the same, forming a supporting surface for the tread of the car wheel, substantially as described.

5. A railway, comprising a series of metal troughs connected together and adapted to be secured to the cross-ties, one side of the trough forming a lateral guide face for the flange of the car-wheel, and the other side of the trough being provided with a lateral flange, an insulated electrical conductor carried by said flange, and a series of wooden blocks fitting tightly in said troughs and forming a supporting surface for the tread of the car wheels, substantially as described.

6. A railway, comprising a series of rolled metal troughs bent into shape to form a flat bottom and resilient sides, the said troughs being connected together to form a continuous rail, one side of the trough forming a lateral guide face for the flange of the car wheel, and a series of wooden blocks fitting tightly in said troughs, the said blocks being held therein solely by said resilient sides, the tops of said blocks forming a supporting surface for the tread of the car wheels, substantially as described.

7. A railway, comprising a series of rolled metal troughs bent into shape to form a flat bottom and resilient sides, the said troughs being connected together to form a continuous rail, one side of the trough forming a lateral guide face for the flange of the car wheel, and a series of wooden blocks having the grain running vertically, fitted tightly in said trough and projecting above the top of the same, the said blocks being held therein solely by said resilient sides, the tops of said blocks forming a supporting surface for the tread of the car wheel, substantially as described.

8. A railway, comprising a series of substantially rectangular rolled metal troughs, bent into shape to form a flat bottom with resilient sides, having their ends connected together, with means for securing the bottoms of said troughs to the cross-ties, and a series of wooden blocks fitted snugly within said troughs, the said blocks being held therein solely by said resilient sides, the tops of said blocks forming a supporting surface for the tread of the vehicle wheels, substantially as described.

9. A railway, comprising a series of substantially rectangular rolled metal troughs bent into shape to form a flat bottom with resilient sides, the said troughs being connected together, means for securing the bottoms of said troughs to the cross ties, one side of the trough forming a lateral guide face for the flange of the car wheel, and a series of wooden blocks having the grain running vertically fitting tightly in said troughs, the said blocks being held therein solely by said resilient sides, the tops of said blocks forming a supporting surface for the tread of the car wheels, substantially as described.

10. A railway, comprising a series of substantially rectangular rolled metal troughs bent into shape to form a flat bottom with resilient sides, the said troughs being connected together, means for securing the bottoms of said troughs to the cross ties, the inside of said troughs being painted with tar, one side of the trough forming a lateral guide face for the flange of the car wheel, and a series of wooden blocks treated with a preservative compound and having the grain running vertically fitting tightly in said troughs and forming a supporting surface for the tread of the car wheels, substantially as described.

11. A railway, comprising a series of substantially rectangular troughs with flat bottoms and resilient sides, said troughs having bent over flanges at their ends whereby said troughs may be connected together, with means for securing the bottoms of said troughs to the cross-ties, one side of the trough forming a lateral guide face for the flange of the car wheel, and a series of wooden blocks fitted snugly within said troughs and held solely therein by said resilient sides, the said blocks forming a supporting surface for the tread of the car wheels, substantially as described.

12. A railway, comprising a series of substantially rectangular metal troughs connected together, said troughs being provided with flat bottoms and resilient sides, means for securing the bottoms of said troughs to the cross-ties, one side of the troughs forming a lateral guide face for the flange of the car wheel, a series of auxiliary bottom plates mounted inside of said troughs, and a series of blocks fitting tightly in said troughs above said bottom plates and forming a supporting surface for the tread of the car wheels, the said blocks being held in said troughs solely by said resilient sides, substantially as described.

13. A track for flanged wheels of vehicles comprising a trough made of rolled steel or iron bent into shape to form a flat bottom and resilient sides, and a core held in said trough solely by the side walls thereof and forming a path for the tread of the wheels, one side of said trough forming a guide plate for the flange of the wheel, substantially as described.

In testimony whereof, I affix my signature, in presence of two witnesses.

THOMAS HENRY WHELESS.

Witnesses:
A. W. NEALE, Jr.,
J. S. GIUSTA.